United States Patent [19]

Haubursin

[11] Patent Number: 4,941,126

[45] Date of Patent: Jul. 10, 1990

[54] WEAK/STRONG BUS DRIVER

[75] Inventor: Pierre F. Haubursin, Austin, Tex.

[73] Assignee: Advanced Micro Devices, Inc., Sunnyvale, Calif.

[21] Appl. No.: 77,349

[22] Filed: Jul. 24, 1987

[51] Int. Cl.$^5$ .......................................... H03K 19/094
[52] U.S. Cl. ..................................... 364/900; 307/270; 307/473; 364/935.42
[58] Field of Search ... 364/200 MS File, 900 MS File; 307/473, 270; 370/85

[56] References Cited

U.S. PATENT DOCUMENTS

| | | | |
|---|---|---|---|
| 4,242,738 | 12/1980 | Dingwall | 307/270 X |
| 4,477,741 | 10/1984 | Moser, Jr. | 307/473 |
| 4,500,988 | 2/1985 | Bennett et al. | 370/85 |
| 4,531,068 | 7/1985 | Kraft et al. | 307/270 X |
| 4,620,310 | 10/1986 | Lvovsky et al. | 307/270 X |
| 4,734,909 | 3/1988 | Bennett et al. | 340/825.5 X |

*Primary Examiner*—Eddie P. Chan
*Assistant Examiner*—Paul Kulik
*Attorney, Agent, or Firm*—Davis Chin

[57] ABSTRACT

Circuit and method is disclosed which prevents contention on a pulse-code modulated (PCM) bus, when different drivers are transmitting during adjacent time slots. The driver circuit switches automatically from a strong driver to a weak driver depending on whether a signal level is merely repeating or whether the level is transiting. Also the driver always employs the strong driver at the onset of transmission.

5 Claims, 7 Drawing Sheets

TWO CLASSIC BUFFERS CONNECTED TO THE SAME EXTERNAL LINE:

WEAK/STRONG BUS DRIVER

This invention relates to tri-state bus driver circuits and, more particularly, to a driver employing a strong tri-state driver, a weak tri-state driver and a sensor designed to avoid harmful bus contention.

BACKGROUND OF THE INVENTION

With reference to FIG. 1, data is serially transferred on pulse coded modulation (PCM) highway at a frequency common to the two communicating subscriber line audio-processing circuits (SLACs), 12 and 14. The clock that is synchronizing data movement on PCM highway 10 is called a PCM clock (PCLK). A frame synchronization signal (FS) is the reference for the data exchange, FS is synchronized with PCLK. One SLAC will transmit data on the PCM highway when the other reads the PCM highway and vice versa. This transaction of data takes place between each FS. Each FS pulse is a timing reference for a transacting between the two considered SLACs. Each transaction has to be finished before the occurrence of the next FS.

There is an integral number of PCLK between two rising edges of FS. Since eight-bits of data is exchanged between the two SLACs, there must be at least 16 PCLK between two rising edges of FS. During the first 8 PCLKs, there will be a transfer of data in one direction and during the last 8 PCLKs, in the other direction as is illustrated in FIG. 2. The first 8 PCLKs are forming the first time slot 16 and the second 8 PCLKs, the second time slot 18. A PCLK period is called a clock slot. Therefore, there are 8 clock slots in one time slot. In the example, illustrated in FIG. 2 PCLK is 16 times faster than FS, i.e., if FS has a frequency of 8 kHz then PCLK has a frequency of 128 kHz.

In different systems, several channels may be exchanged on the PCM highway. Therefore a larger number of time slots is needed, and PCLK must have a higher frequency. In the case of a Digital Exchange Controller (DEC) such as that manufactured by Advanced Micro Devices, Inc. as part number 79C31, PCLK can go from 64 kHz (one time slot) up to 8.192 MHz (128 time slots). In the case of a SLAC, PCLK can go from 64 kHz to 4.096 Mhz (64 time slots).

All the circuits that have one PCM highway 10 in common must have the same FS and PCLK. Ideally, all the circuits connected to highway 10 are the same and are receiving FS and PCLK at the same time. However, in practice the circuits will have a range of timing characteristics such as the DEC specifications shown in timing diagram of FIG. 3, described in Table 1. With reference to FIG. 3, PCLK 20 and FS 22 are synchronized in such a way that the falling edge 24 of PCLK is to occur when the FS signal is HIGH 26; the duration of the HIGH FS signal is defined by tFSS and tFSH (Table I). A clock slot starts from the time at which PCLK is LOW and ends at the time at which PCLK becomes LOW again. A delay tDXD 28 is incurred before the first data on the PCM highway; the data must be held for time tDXH 30 so that it can catch the falling edge of PCLK 20 in the receiving circuit. The eighth bit is the last one of the slot, so it takes a time tDXZ 32 for the PCM highway to go back to a high-impedance (HI-Z) mode. The timing specifications are similar for a SLAC, although the values are different since the SLAC is a slower circuit.

The problem sought to be addressed by the present invention is the following: The user allocates adjacent time slots for writing on the PCM highway. FIG. 4 illustrates a situation in which the first driver circuit 34 that writes on the PCM highway has relatively slow timing characteristics and the second driver circuit 36 that writes on the PCM highway has relatively fast timing characteristics. The timing specifications in Table I indicate a range of 10 to 70 nsec for both tDXD and tDXZ. Suppose the slow circuit 34 turns off its last bit 38 during 70 nsec, i.e., the output driver turns off 70 nsec after the falling edge of PCLK, and that the fast driver 36 turns on 10 nsec after the falling edge of PCLK in order to transmit the first bit 40. This results in 60 nsec 42 during which both output drivers 34 and 36 attempt to write on the PCM highway. If the drivers attempt to transmit the same data, there is no bus contention; if the drivers attempt to transmit opposite data, the pull-up transistor 43 of one driver will be on as well as the pull-down transistor 44 of the other driver. A large current 45 will be conducted through the two devices and it could damage either or both circuits, probably the fastest one.

TABLE I

PCM Highway Timing
Conditions: O < Ta < 70° C., 4.75 v < Vcc <5.25 v, load capacitance on logic outputs (Cl) = 150 pF, 360 ohm pullup on TSCx.

| Symbol | Description | Min | Type | Max | Unit |
|---|---|---|---|---|---|
| $t_{PCY}$ | PCM Clock Period | 0.122 | | 16 | us |
| $t_{PCH}$ | PCM Clock High Pulse Width | 48 | | | ns |
| $t_{PCL}$ | PCM Clock Low Pulse Width | 48 | | | ns |
| $t_{PCF}$ | Fall Time of Clock | 5 | | 15 | ns |
| $t_{PCR}$ | Rise Time of Clock | 5 | | 15 | ns |
| $t_{FSS}$ | Frame Sync Setup Time | 25 | | $t_{PCY}-30$ | ns |
| $t_{FSH}$ | Frame Sync Hold Time | 20 | | | ns |
| $t_{TSD}$ | Delay to TSC Valid | 10 | | 70 | ns |
| $t_{TSD}$ | Delay to TSC Off | 10 | | 60 | ns |
| $t_{DXD}$ | PCM Data Output Delay | 10 | | 70 | ns |
| $t_{DXH}$ | PCM Data Output Hold Time | 10 | | 70 | ns |
| $t_{PXZ}$ | PCM Data Output Delay to High Z | 10 | | 70 | ns |
| $t_{DRB}$ | PCM Data Input Setup Time | 25 | | | ns |
| $T_{DRH}$ | PCM Data Input Hold Time | 5 | | | ns |

Now, with reference to FIG. 5, even if both driver circuits 34 and 36 have perfectly identical timing characteristics in that one is writing on the PCM highway just after the other, the system will probably have imperfections so that each driver circuit will detect the falling edge of PCLK at slightly different times; there might be a delay of several nanoseconds due to wire length, distance between boards, etc. So, it is possible that an overlap 46 can be created even if the drivers as shown in FIG. 5 are identical. This could damage the circuits as well.

To avoid that problem, the user could leave one clock slot free 48 as shown in FIG. 6 between two time slots during which two different circuits put data on the bus. This solution, however, imposes an undesired restriction on the user. A circuit capable of eliminating this restriction on the user, and yet avoids bus driver contention, is a more desirable solution.

DETAILED DESCRIPTION OF A PREFERRED EMBODIMENT

Figure 1:
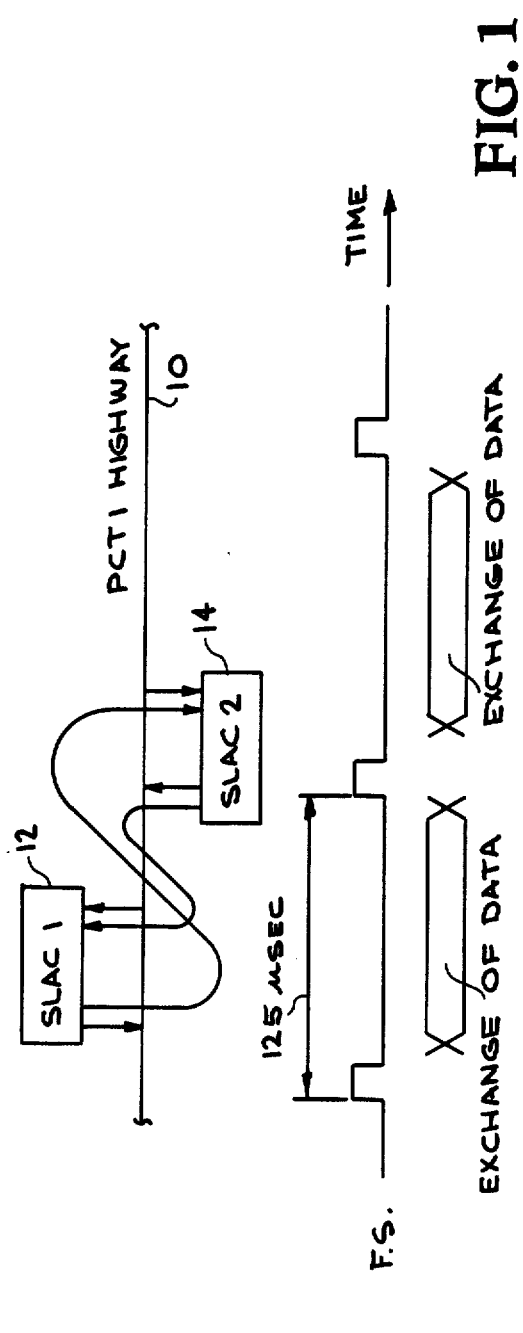
FIG. 1 illustrates interconnection of two subscriber line audio processing circuits (SLACs) to a pulse coded modulation (PCM) highway.
Figure 2:
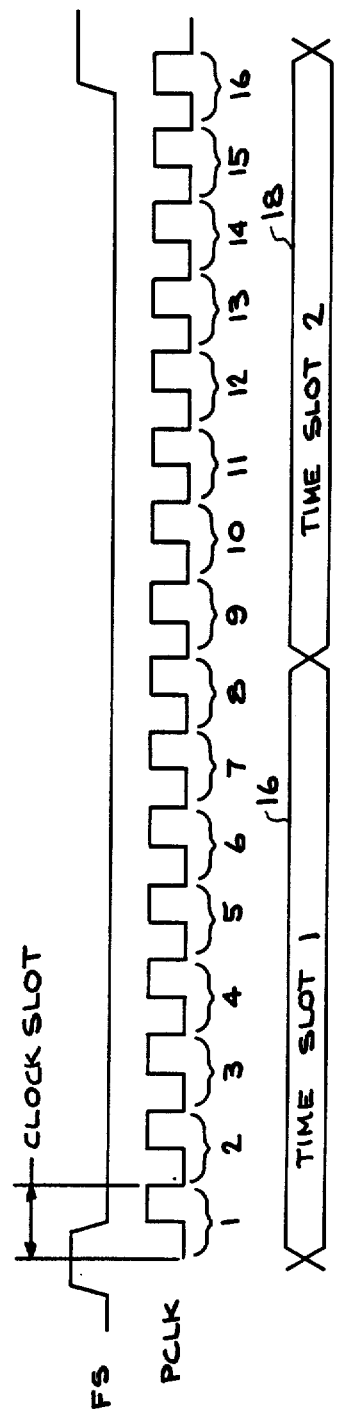
FIG. 2 is a timing diagram illustrating transmission of data on the PCM highway.
Figure 3:
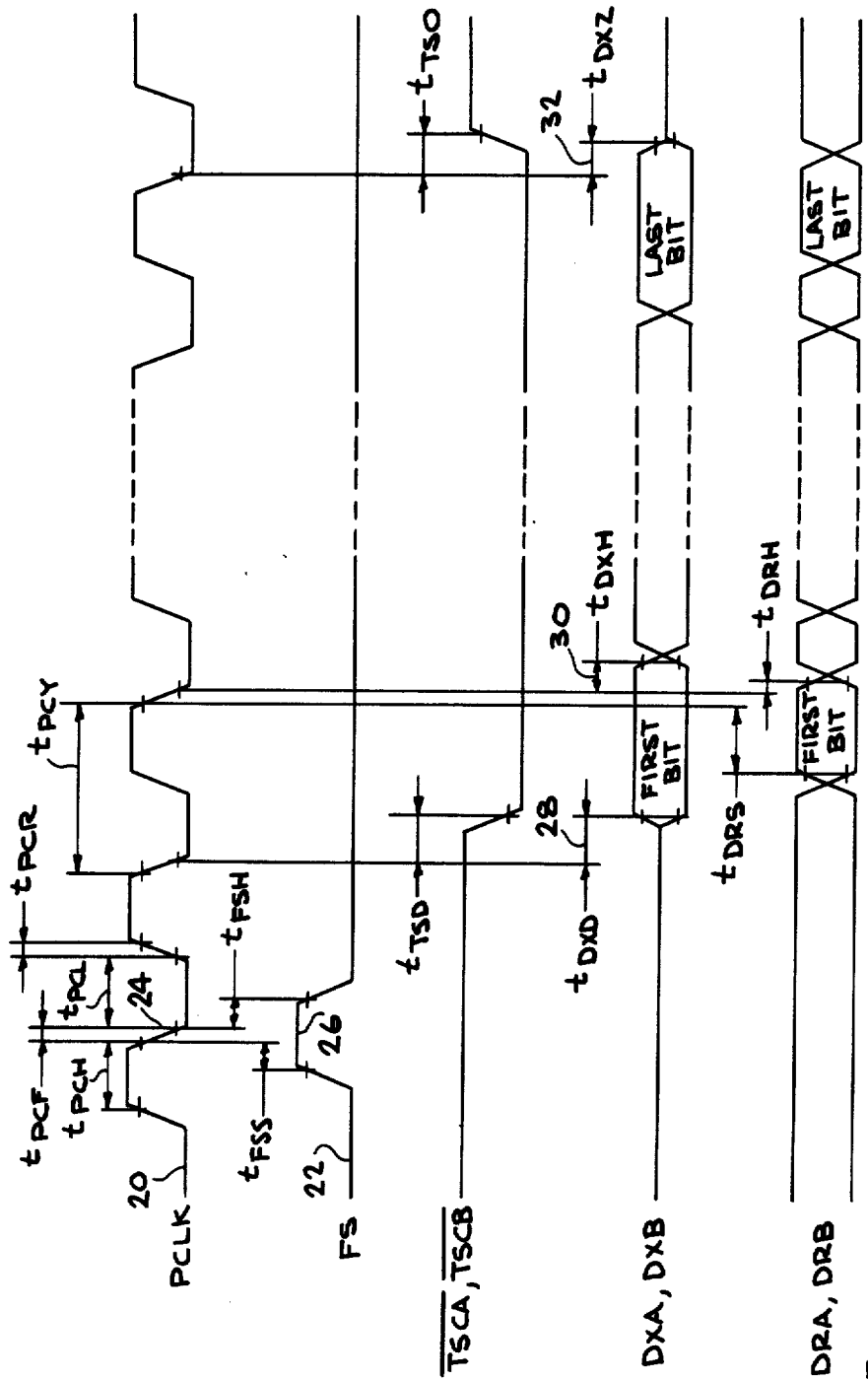
FIG. 3 illustrates in greater detail the timing of data transmitted on the PCM highway.
Figure 4:
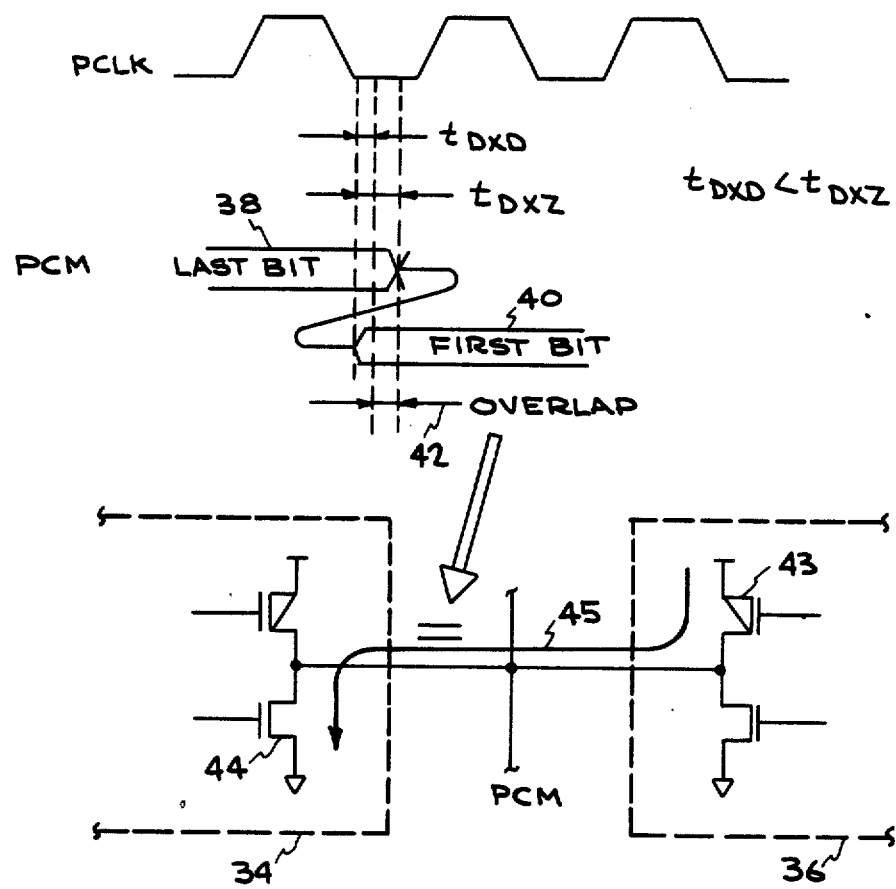
FIG. 4 illustrates the bus contention problem addressed by the instant invention.
Figure 5:
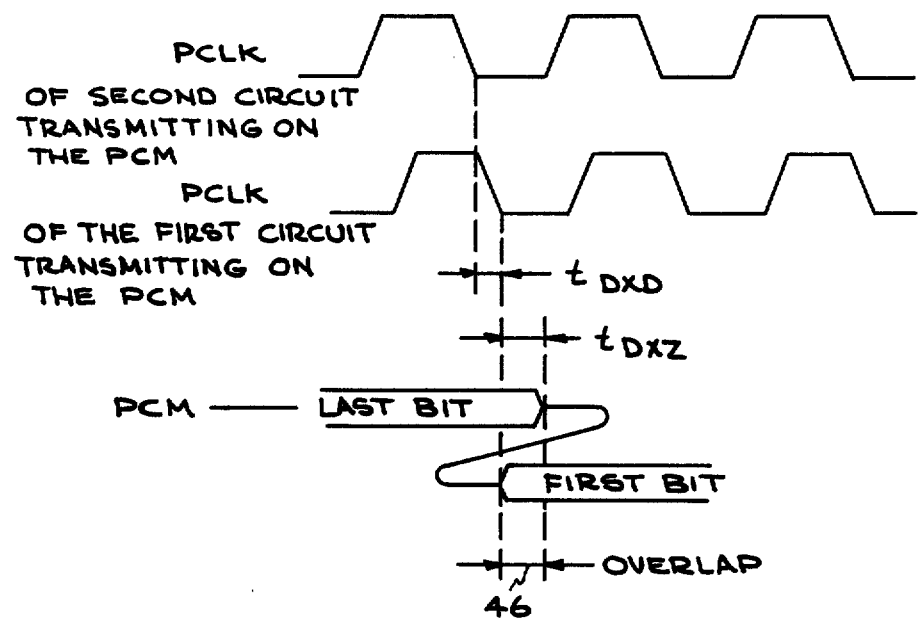
FIG. 5 illustrates another aspect of the bus contention addressed by the instant invention.
Figure 6:
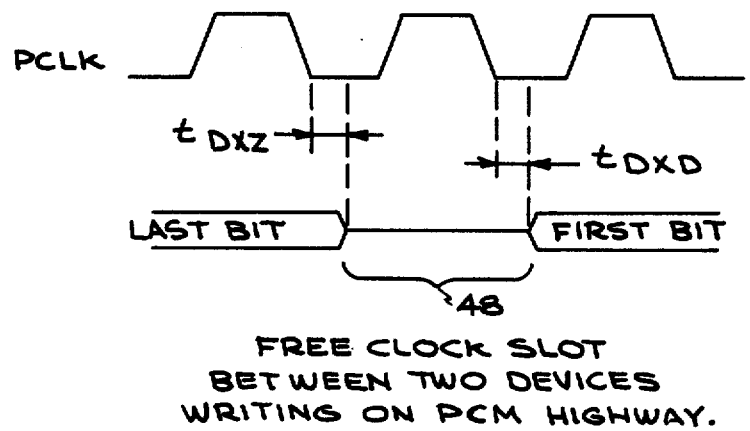
FIG. 6 illustrates one method of eliminating bus contention.
Figure 7:
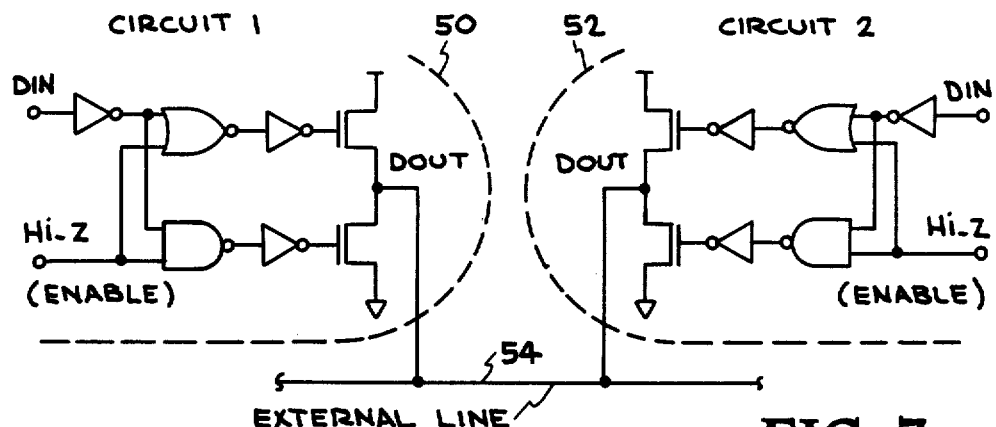
FIG. 7 illustrates the connection of two tri-state bus drivers connected to a signal line.

With reference now to FIG. 7 two tri-state bus drivers 50 and 52 are illustrated, each being on different circuits, driving the same external line 54. The bus drivers are programmed to drive the line 54 at different times; when they do not drive the line, they assume a "tri-state" mode as is well known to those skilled in the art. Suppose that after the same synchronizing clock edge, common to the two circuits, one driver is disabled and the other is enabled so that one driver turns off, i.e., enters the "tri-state" mode while the other turns on, i.e., begins transmitting. This arrangement requires that the first driver is off when the second driver turns on. Given the spread in device characteristics of the circuit fabrication process (Table I), it is possible that the second driver 52 will turn on before the first 50 is off. As described above in connection with FIG. 4, this causes surges of current and possible circuit damage if the drivers try to set the external line at opposite levels. This problem exists because of a restriction of the circuit specifications to use only one clock edge for synchronization.

Figure 8:
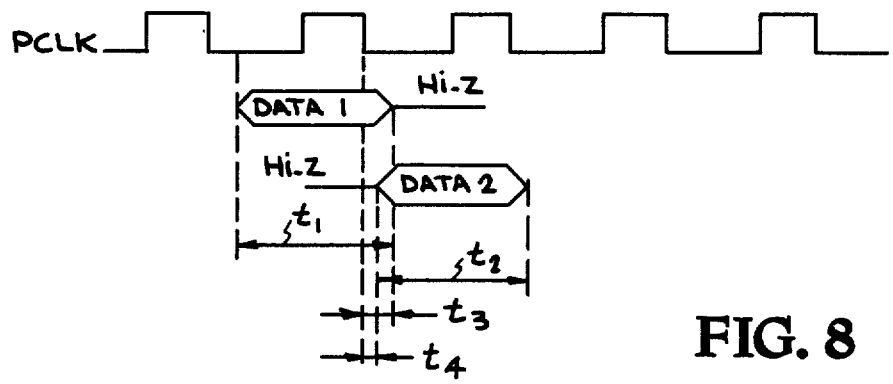
FIG. 8 illustrates the timing of data transmission by the drivers shown in FIG. 7.

The data rate on the serial bus 54 is dictated by PCLK. With reference to FIG. 8, one driver 50 drives during a time t1 and the other 52, during a time t2. The drivers are otherwise in high impedance (HI-Z) state. It takes the time t3 for the first driver 50 to react to the disabling signal which puts it in high impedance mode and it takes a time t4 for the second driver 52 to react to the enabling signal which puts it in driving mode. The time at which either enabling or disabling signals are latched corrsponds to the falling edge of PCLK. Depending upon the device characteristics of each circuit, t3 can be larger than t4 or conversely. We consider the case where t4 is smaller than t3. This implies that the second driver 52 is trying to drive the data on the bus 54 while the first driver 50 is still driving the bus and not yet disabled.

Figure 9A:
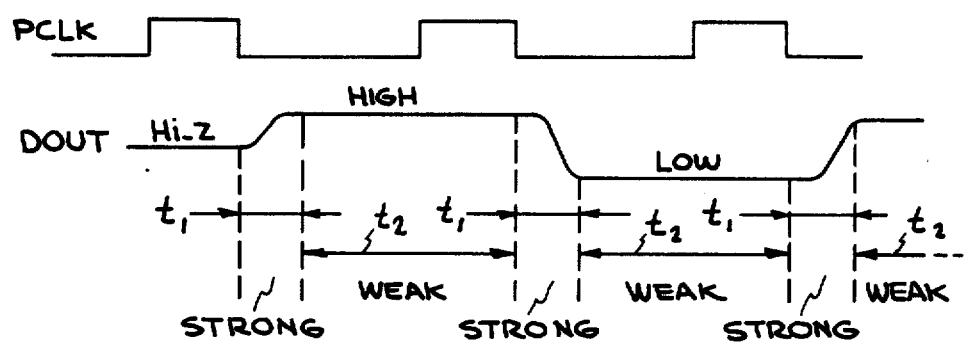
FIGS. 9A, 9B and 9C are timing diagrams illustrating aspects of the weak/strong bus driver of the instant invention.

Of importance when driving a bus is to bring the bus to the right level within the proper delay. Once it has reached that level, no strong driver is needed anymore; a weak driver can hold a level until a next transition has to be performed by the strong driver. With reference to FIG. 9A, we can observe the waveform generated by the bus driver. During the times t1, a transition has to be performed and a strong driver is needed. During the times t2, no transition occurs, therefore, a weak driver can hold the bus at the proper level.

Figure 9B:
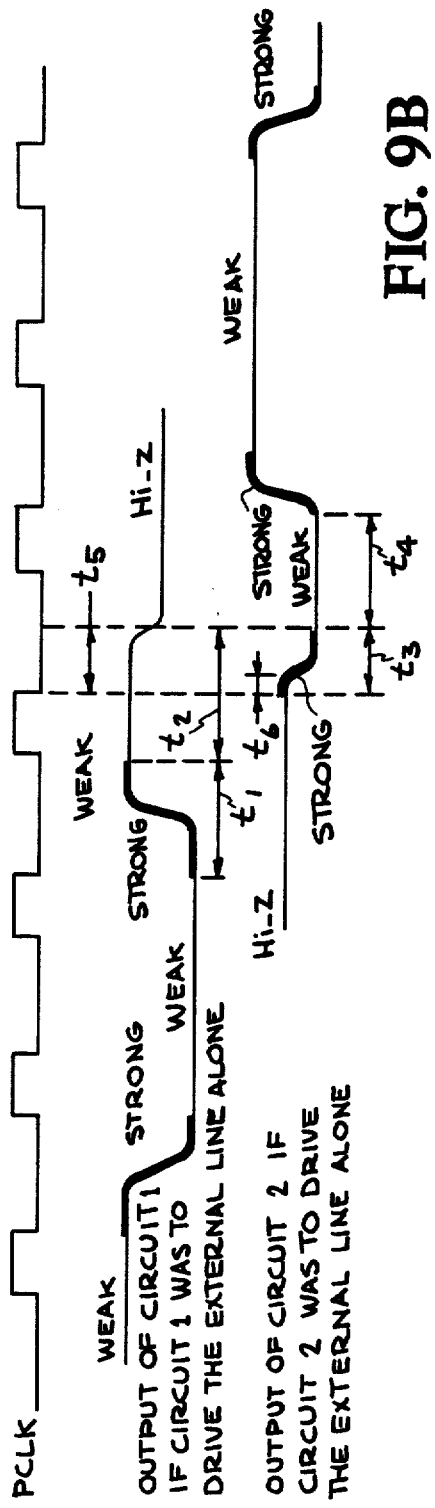

The import of this observation is best appreciated when two drivers are connected to the same signal line (FIG. 7). With reference to FIG. 9B, the first circuit 50 is driving the bus 54 during the time t1 with a strong driver and holding the bus during a time t2 with a weak driver. The second circuit is driving the bus during the time t3 with a strong driver and holding the bus during a time t4 with a weak driver. It takes a time t5 for the first circuit 50 to go back to high impedance mode, and it takes a time t6 for the second circuit 52 to be enabled. In this case, there is a conflict between a strong driver and a weak driver. To avoid damage then, one can design the weak driver to present enough resistance so that a very limited current would flow through the conflicting drivers.

Figure 9C:
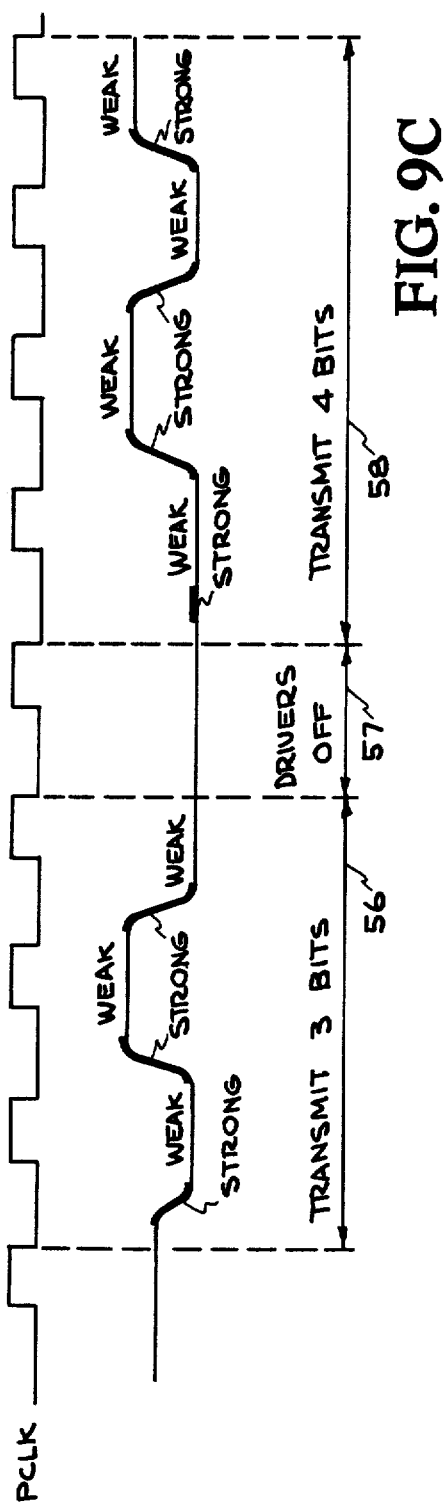

Another observation is that as long as each circuit transmits in series the same data, there is no need for enabling the strong driver. This follows from the observation that a driver which transmits serially bits of data does not use its strong driver for each bit, but only when following transmission of a particular level of bits (say HIGH) a transition to a LOW is needed. A final point to consider is the first bit transmitted by one of the circuits. The external line could be floating and its level could be anywhere between the levels of the power supplies. This implies that it is ensured that the strong driver is enabled for transmitting the first bit of the series of bits transmitted at the PCLK rate without interruption. For example, by referring at FIG. 9C, the circuit is transmitting a series of 3 bits 56, then a series of 4 bits 58 with a "dead time" 57 in between. During that "dead time" another driver circuit can transmit data. Whatever the state of the external line is, the strong driver has to drive the first bit of each series.

Figure 10:
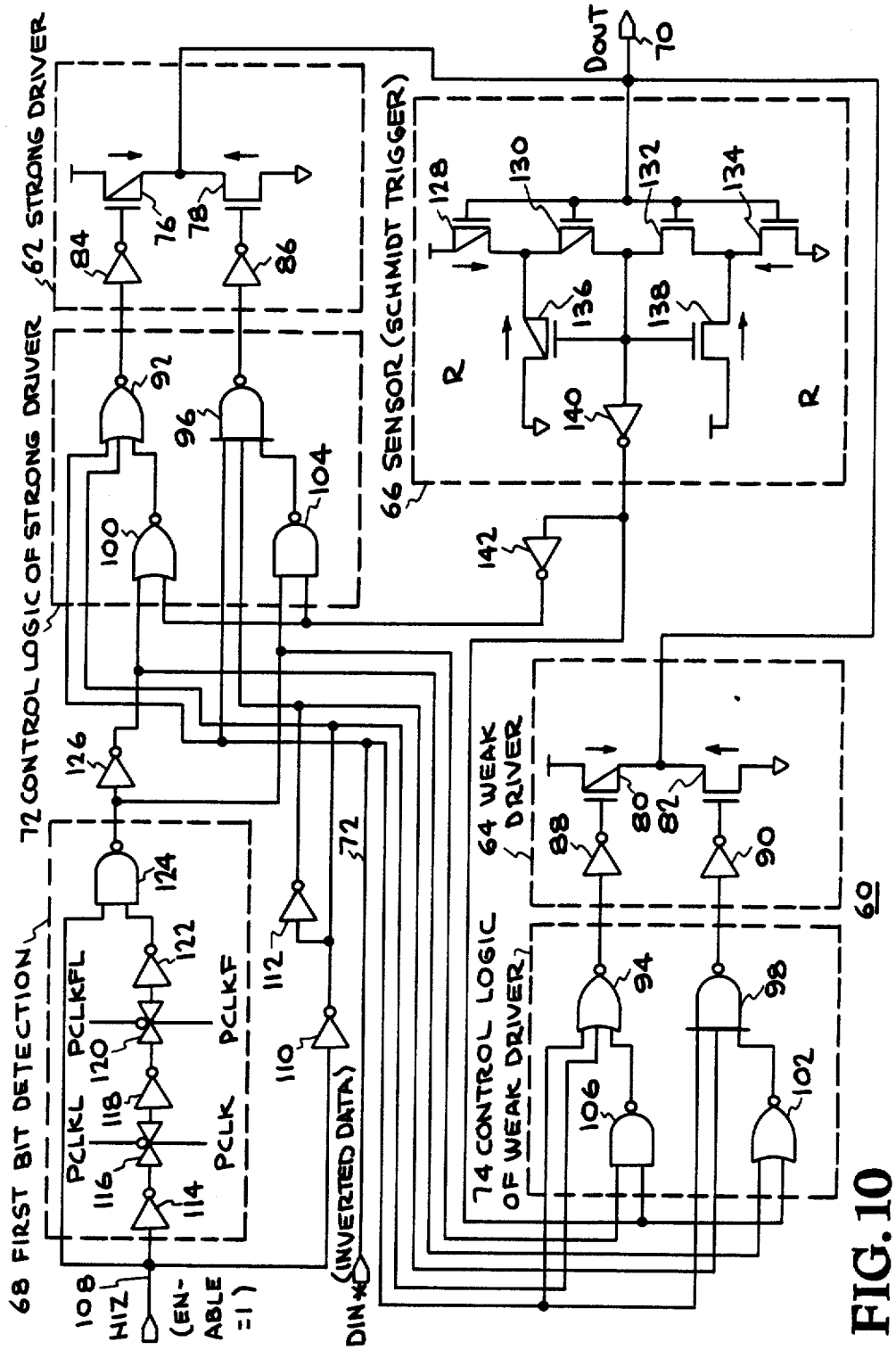
FIG. 10 is a logic diagram of a weak/strong bus driver of the instant invention.

The weak/strong driver combination 60 of the instant invention is shown in FIG. 10. FIG. 10 indicates which portions of the device 60 are related to the strong driver 62, the weak driver 64, the sensor 66 and the first bit detection 68. In accordance with the observation made above, the strong driver 62 must be used to transmit the first bit of a series, as detected by first bit detection unit 68. The sensor 66 detects the level of the external line 70. Other than for the first bit of a series, if the level is identical to the one of the data to be transmitted, the weak driver 64 stays enabled. Otherwise, if the level of the external line is different from the one of the data to be transmitted, the strong driver 62 is enabled. As soon as the line has reached the appropriate level, the strong driver is disabled and the weak driver takes over. Therefore, whether the strong driver is enabled or not depends on the result of the comparison between what is on the line and what has to be driven on it, as determined by sensor 66.

Control logic portions of driver 60, one 72 for the strong driver 62 and one 74 for the weak driver 64 are also shown in FIG. 10.

The strong and weak drivers 62 and 64 each comprise two CMOS transistors 76 and 78, and 80 and 82, respectively, and two inverters 84 and 86, and 88 and 90, respectively. The output terminal of each inverter 84, 86, 88, 90 is connected to the gate of a corresponding transistor 76, 78, 80, 82. The drains of transistors 76 and 78 are connected in common and to the external line 70, as are the drains of transistors 80 and 82. The source of transistors 76 and 80 are connected to a positive voltage source, the drains of transistors 78 and 82 are connected to ground. As such, portions 62 and 64 of driver 60 are conventional tri-state drivers.

Similarly, the control logic portions 72 and 74 are conventional, each having a NOR gate 92 and 94, respectively, each having its output terminal connected to the input terminal of inverter 84 and 88, respectively. Each has a NAND gate 96 and 98, respectively, its output terminal connected to the input terminal of inverter 86 and 90, respectively. In control logic 72, the output of a second NOR gate 100 is connected to a first input of gate 92. In control logic 74, the output of a second NOR gate 102 is connected to a first input of gate 98. In control logic 72 the output of a second NAND gate 104 is connected to a first input of gate 96. In control logic 74 the output of a second NAND gate 106 is connected to a first input of gate 94.

The data to be transmitted (DIN) in inverted form is received on signal line 72 and conducted to a second input of gates 92, 96, 94 and 98. A high-impedance (HIZ) input signal (active in a logic HIGH level) is received on a signal line 108 and is conducted to an input of an inverter 110. The HIZ signal, indicates whether DIN is to be transmitted or ignored, depending on whether HIZ is active or inactive, respectively. The output signal generated by inverter 110 is conducted to a third input of gates 92 and 94. The output signal is also conducted to the input of an inverter 112 and the output signal so generated is conducted to a third input of gates 96 and 98.

The first-bit detection 68 also receives the HIZ signal at an input to an inverter 114. The output signal generated by inverter 114 is conducted to an input terminal of an MOS transmission gate switch 116. Switch 116 receives the PCM clock (PCLK) signal which enables (closes) the switch and receives complemented PCM clock (PCLKL) which disables (opens) the switch. The signal conducted by switch 116 is received by an inverter 118 which generates a signal conducted to an input terminal of an MOS transmission gate switch 120. Switch 120 receives a PCM clock fall (PCLKF) (the PCLKF signal is non-overlapping the PCLK signal) signal which disables the switch. And a complemented PCLKFL signal which disables switch 120. PCLK and PCLKF have durations as non-overlapping clocks. The signal conducted by switch 120 is received by an inverter 122 which generates a signal conducted to a first terminal of a NAND gate 124. The HIZ signal is conducted to a second terminal of NAND gate 124.

Elements 114, 116, 118, 120, 122 and 124 form an edge detector, inverters 114 and 118 isolate stages formed by transfer gates 116 and 120, and create a storage node for the transfer gates. These elements detect the rising edge of the HIZ signal as it is first activated, indicating the first bit to be transmitted. The signal generated by NAND gate 124 is one PCLK period long and is active during the PCLK period corresponding to reception of the DIN signal representing the first bit to be transmitted. The signal generated by gate 124 is at a logic LOW level when the first bit is transmitted. This signal is conducted to a second input of gate 104 and gate 106 and via an inverter 126 to a second input of gate 100 and 102.

Finally, sensor 66 receives the data out (DOUT) signal generated by driver 60 at the gates of a group of four CMOS transistors 128, 130, 132 and 134. These transistors and MOS transistors 136 and 138 form a Schmidt trigger circuit forming part of a comparator for the DIN and DOUT signals. The source of transistor 128 is connected to a positive voltage and the drain and source of transistors 128 and 130, respectively, are connected to the drain of transistor 136. The source of transistor 136 is also connected to ground. The gates of transistors 136 and 138 are connected to the drains of transistors 130 and 132. The source and drain of transistors 132 and 134, respectively, are connected to the drain of transistor 138. The source of transistor 138 is connected to a positive voltage and the source of transistor 134 is connected to ground.

The common connection of gates of transistors 136 and 138, the drain of transistor 130 and source of transistor 132 is connected to an input of an inverter 140. The signal generated at the output of inverter 140 is conducted to a second input of gates 102 and 106, and via an inverter 142 to a second input of gates 100 and 104. The application of the output signal generated by first-bit detection 68 to the first terminal of gates 100, 102, 104 and 106 assures that the strong driver 62 is always enabled for transmission of the first bit of a series of bits, as described hereinabove.

Briefly, the sensor 66 operates as a Schmidt trigger that interprets a logic "1" level on line 70 as any voltage above 2.4 volts and a logic "0" as any voltage below 0.4 volts. Between these voltages, sensor 66 does not toggle. If the PCM highway line 70 is initially between these voltages, the sensor 66 does not provide the control logic portions 72 and 74 with any information about the status of the PCM highway. Accordingly, the control logic portion 72 will always cause the strong driver 62 to become enabled initially. Following the first bit of transmission, switching between the drivers occurs when sensor 66 detects a transition.

The individual operation of strong driver 62 and weak driver 64 are otherwise conventional as are their control logic circuits 72 and 74, respectively. Accordingly, their operation will not be described herein.

What is claimed is:

1. A bus driver circuit for transmitting a series of output bits having two logic levels onto a bus comprising:

a first input terminal for receiving a series of input bits including a first bit, each of said series of input bits having two logic levels;

strong bus driver means (62) coupled to said bus (70);

weak bus driver means (64) coupled to said bus (70);

one of said strong bus driver means and said weak bus driver means being selectably enabled and the other one of said strong bus driver means and said weak bus driver means being selectably disabled for each bit of said series of input bits for generating the series of output bits onto said bus;

detection means (68) responsive to timing signals and an enable signal for generating a signal indicative of the reception of said first bit of said series of input bits to be transmitted;

sensing means (66) for generating a sense signal which is at a first predetermined level when said strong bus driver means (62) is to be enabled and said weak bus driver means (68) is to be disabled and which is at a second predetermined level when said weak bus driver means (64) is to be enabled and said strong bus driver means (62) is to be disabled;

first logic means (72) responsive to said sense signal for selectively enabling and disenabling said strong bus driver means (62) so as to transmit said series of input bits;

second logic means (74) responsive to said sense signal for selectively enabling and disenabling said weak bus driver means (64) so as to transmit said series of input bits;

said first logic means (72) being responsive to said first bit reception signal for initially enabling said strong bus driver means (62) to transmit said first bit of said series of input bits as a first signal of said series of output bits onto said bus;

said second logic means (74) being responsive to said first bit reception signal for initially disabling said weak bus driver means (64);

said sensing means (66) enabling said weak bus driver means (64) and disabling said strong bus driver means (62) when said first signal reaches a selected voltage level defining a current logic level;

said sensing means (66) subsequently comparing the logic level of each subsequent bit in said series of input bits to be transmitted with the corresponding current logic level of the bus and for generating the sense signal of the first predetermined level when the logic level of said each subsequent bit is different from the corresponding current logic level of the bus; and said sensing means (66) generating said sense signal of the second predetermined level when the logic level of said each subsequent bit is the same as the corresponding current logic level of the bus.

2. A bus driver circuit as claimed in claim 1, wherein said first and second logic means (72, 74) are responsive to a high logic level of said enable signal for disabling said strong and weak bus driver means (62, 64).

3. A bus driver circuit as claimed in claim 1, wherein said sensing means (66) comprises a Schmidt trigger.

4. A bus driver circuit as claimed in claim 1, wherein said detection means (68) is comprised of first, second and third inverters (114, 118, 122), first and second transmission gates (116, 120), and a NAND logic gate (124), said first inverter 114 having its input connected to receive said enable signal and its output connected to an input terminal of said first transmission gate (116), said second inverter (118) having its input connected to an output terminal of said first transmission gate (116) and its output connected to an input terminal of said second transmission gate (120), said third inverter (122) having its input connected to an output terminal of said second transmission gate (120) and its output connected to a first input of said NAND gate (124), said NAND gate (124) having a second input connected to receive said enable signal, the output of said NAND gate (124) providing said first bit reception signal.

5. A bus driver circuit as claimed in claim 17, wherein said Schmidt trigger is comprised of first, second and third P-channel MOS transistors (128, 130, 136), first, second and third N-channel MOS transistors (132, 134, 138), and an inverter (140), said first and second P-channel transistors (128, 130) and said first and second N-channel transistors (132, 134) having their gates connected together and to said bus (70), said first P-channel transistor (128) having its source connected to a supply potential and said second N-channel transistor (134) having its source connected to a ground potential, said third P-channel transistor (136) having its drain connected to the drain of said first P-channel (128) and to the source of said second P-channel transistor (130), said third N-channel transistor (138) having its drain connected to the source of said first N-channel transistor (132) and to the drain of said second N-channel transistor (134), said third P-channel transistor (136) and said third N-channel transistor (138) having their gates connected together and to the drains of said second P-channel transistor (130) and said first N-channel transistor (132), said third P-channel transistor (136) having its source connected to the ground potential and said third N-channel transistor (138) having its source connected to the supply potential, said inverter (140) having its input connected to the gates of said third P-channel transistor (136) and third N-channel transistor (138) and its output providing said sense signal.

* * * * *